United States Patent [19]

Scaramucci

[11] Patent Number: 4,905,728
[45] Date of Patent: Mar. 6, 1990

[54] SWING CHECK VALVE WITH HINGE PIN RETAINER

[76] Inventor: John P. Scaramucci, 10724 Woodridden, Oklahoma City, Okla. 73170

[21] Appl. No.: 212,255

[22] Filed: Jun. 27, 1988

Related U.S. Application Data

[62] Division of Ser. No. 77,907, Jul. 27, 1987, abandoned.

[51] Int. Cl.[4] .............................................. F16K 15/03
[52] U.S. Cl. ............................... 137/515.5; 137/515.7; 137/527.8
[58] Field of Search ............................. 137/527–527.8, 137/515.5, 515.7

[56] References Cited

U.S. PATENT DOCUMENTS

| | | |
|---|---|---|
| 2,532,067 | 11/1950 | La Bour . |
| 3,565,107 | 2/1971 | Bunch . |
| 3,720,228 | 4/1973 | Wheatley, Jr. . |
| 3,817,277 | 6/1974 | Wheatley . |
| 3,933,173 | 1/1976 | Kajita . |
| 4,201,241 | 5/1980 | Schertler . |
| 4,230,150 | 10/1980 | Scaramucci . |
| 4,274,436 | 6/1981 | Smith . |
| 4,586,534 | 5/1986 | McNeely . |
| 4,605,041 | 8/1986 | Teumer . |

FOREIGN PATENT DOCUMENTS

| | | |
|---|---|---|
| 19298 | of 1913 | United Kingdom ............. 137/515.5 |
| 2079406 | 11/1980 | United Kingdom . |

Primary Examiner—Robert G. Nilson
Attorney, Agent, or Firm—Dunlap, Codding, Peterson & Lee

[57] ABSTRACT

A swing check valve where the opposite end portions of the hinge pin of the disc are held in hinge pin recesses by an annular wall in the valve body. The wall in the valve body is sufficiently sized that the valve disc can swing through the wall through an arc of substantially 90° between in its open and closed positions. The wall may be formed as a part of the valve body or as a separate retainer ring secured in the valve.

11 Claims, 7 Drawing Sheets

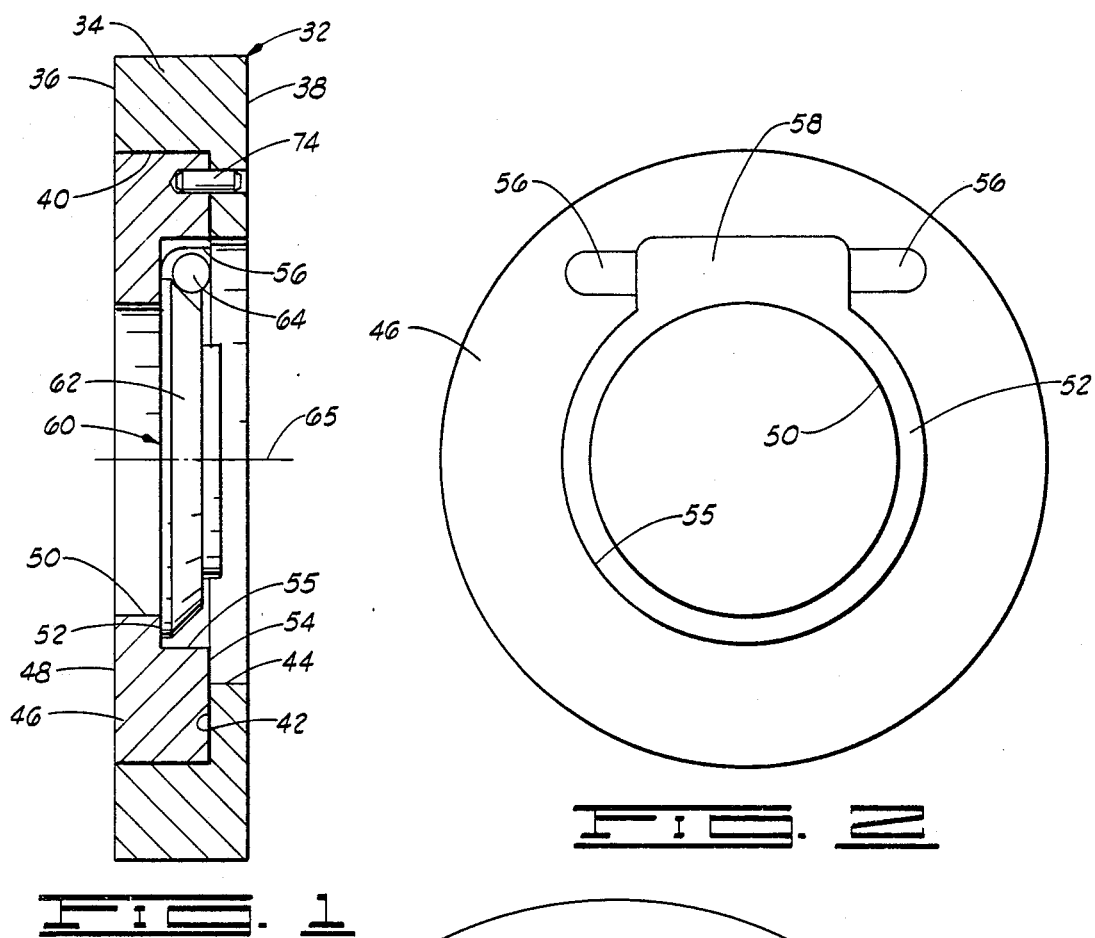
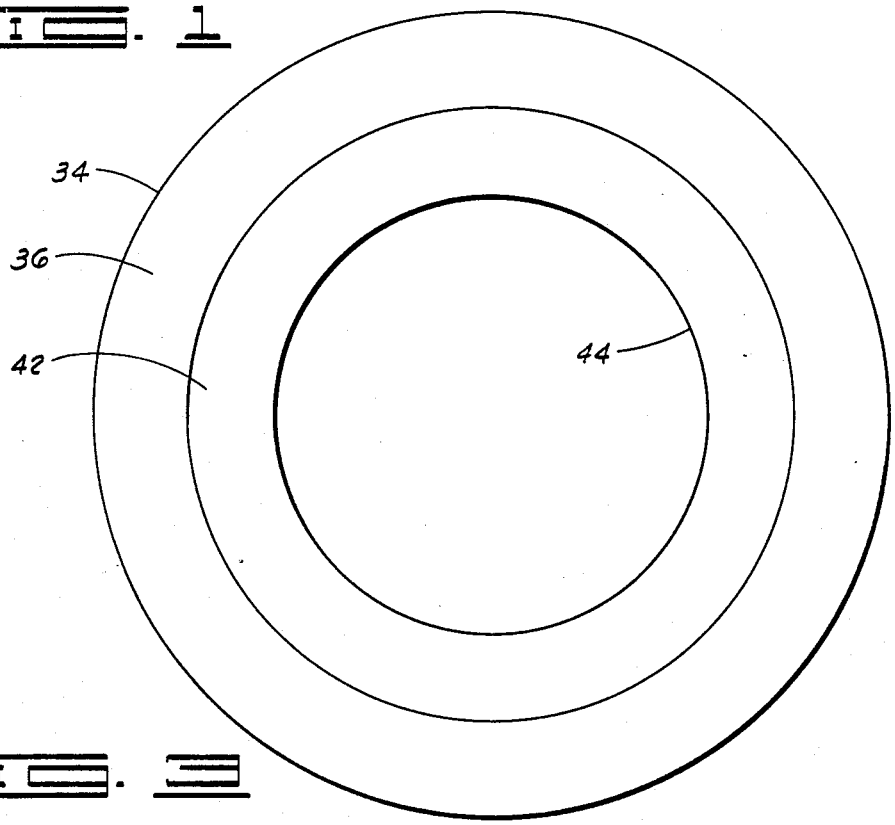

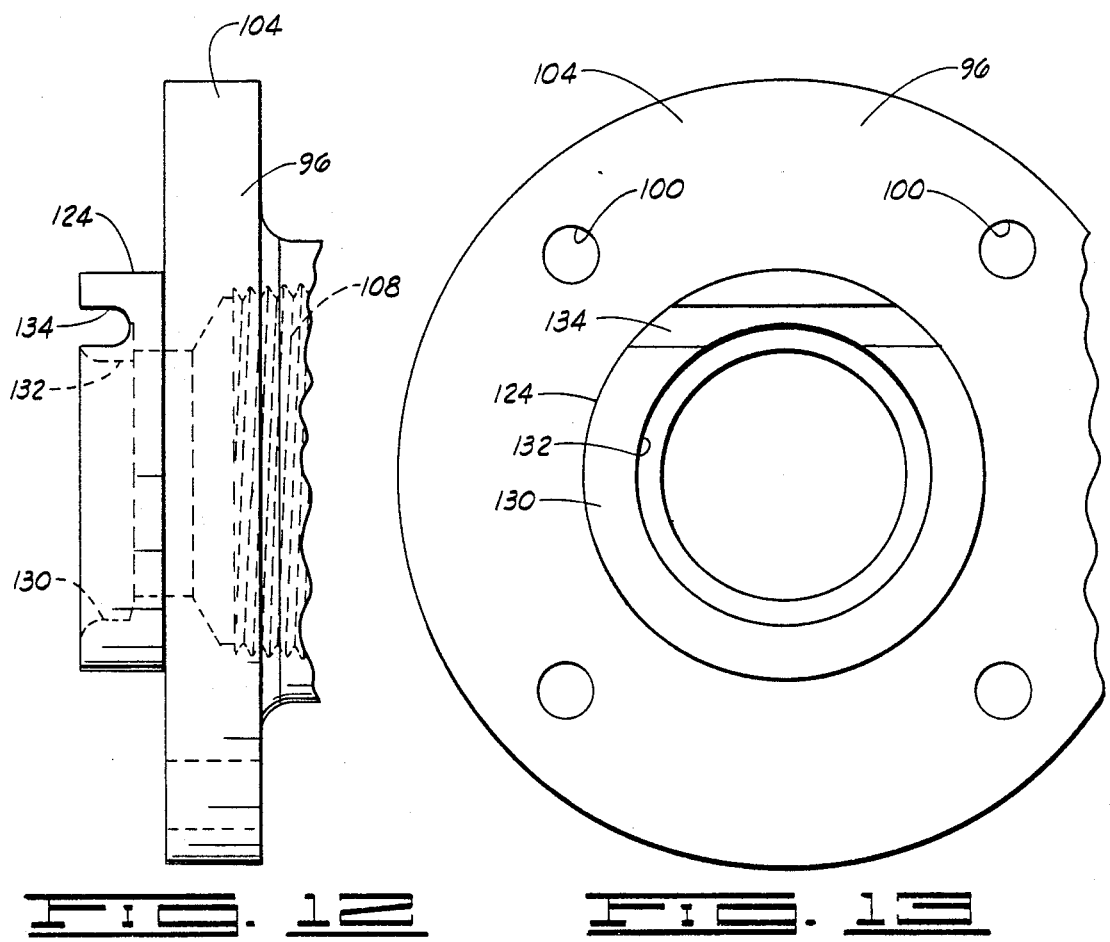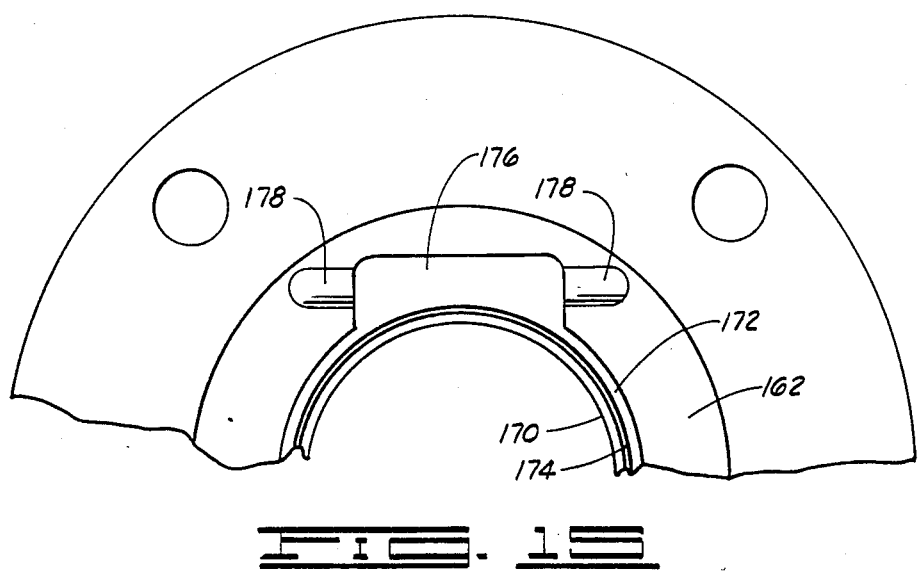

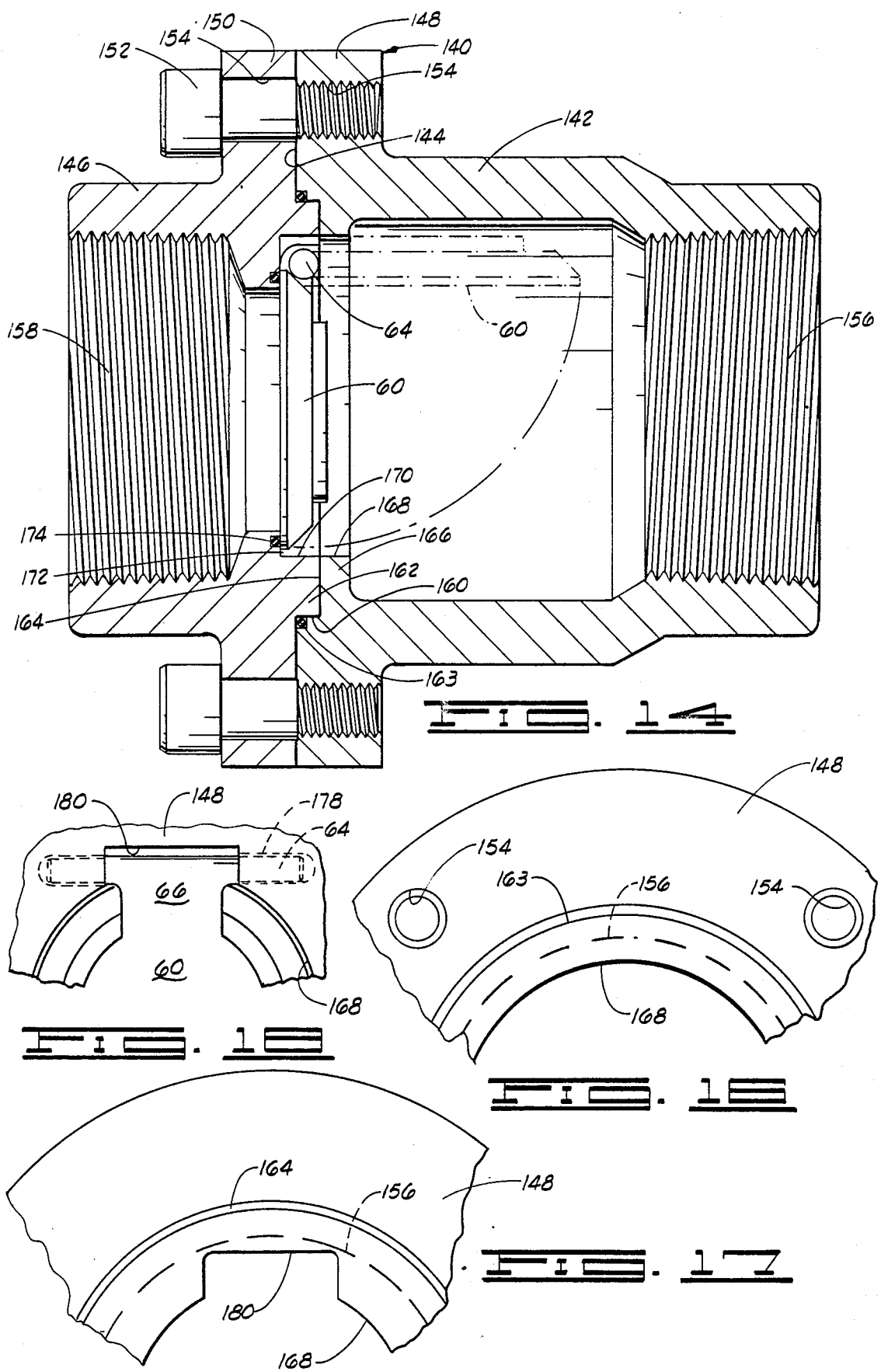

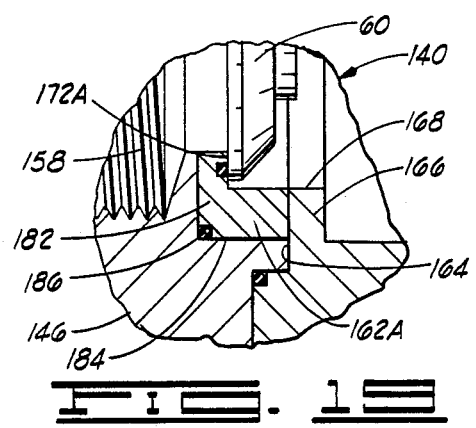
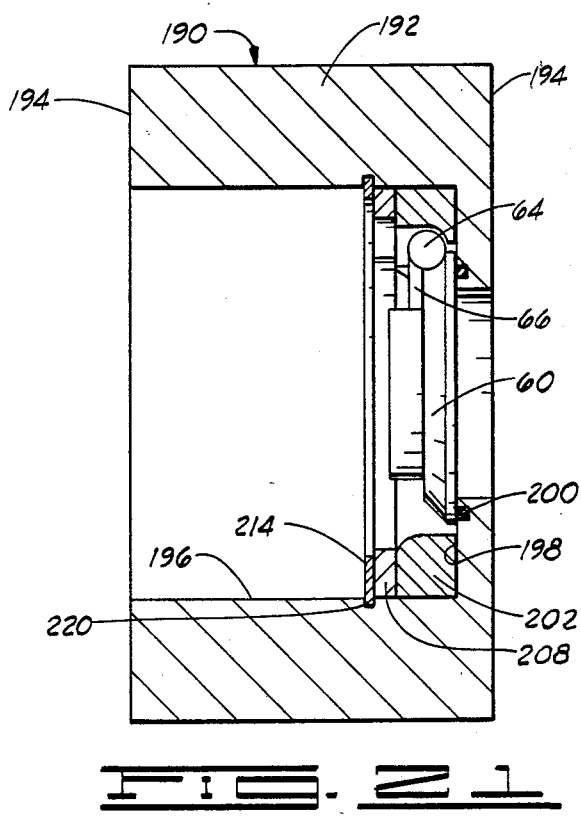
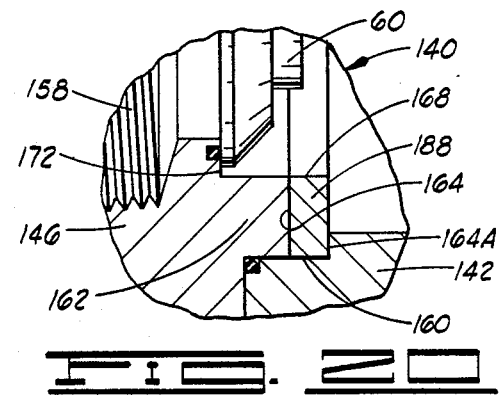
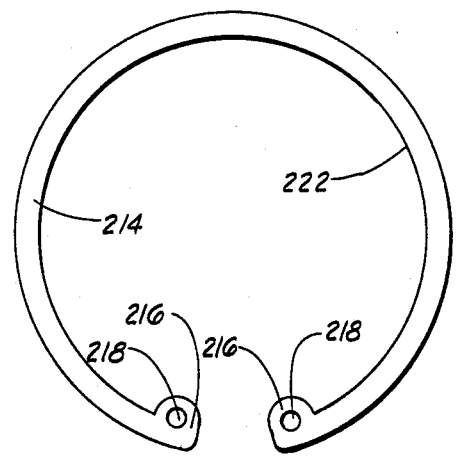
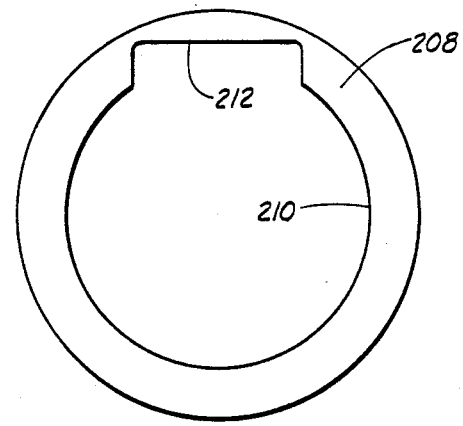
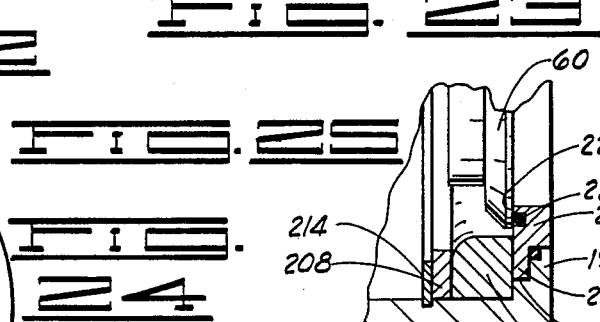
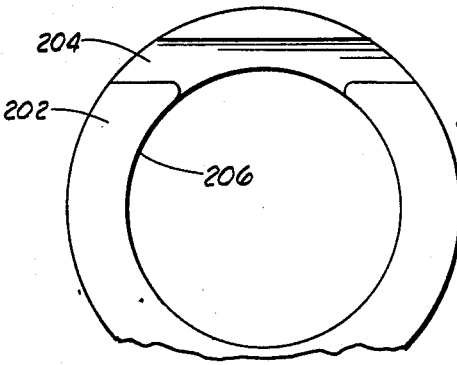

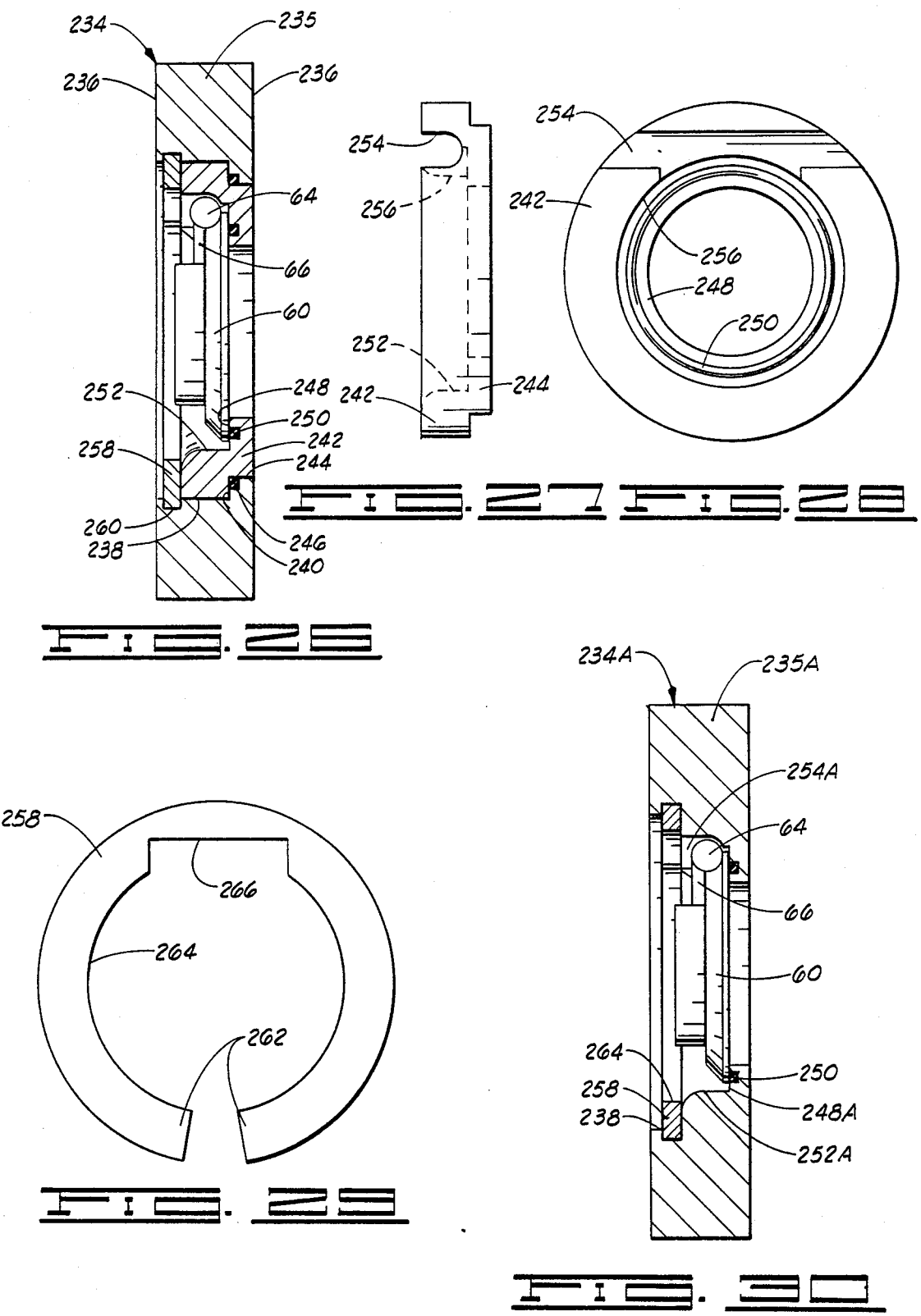

SWING CHECK VALVE WITH HINGE PIN RETAINER

CROSS-REFERENCE TO RELATED APPLICATION

This is a division of co-pending application Ser. No. 77,907 filed on July 27, 1987, now abandoned.

The subject matter disclosed and claimed herein is related to the subject matter disclosed and claimed in U.S. Ser. No. 023,786, filed Mar. 9, 1987 entitled Check Valve, now abandoned; U.S. Ser. No. 049,383, filed May 13, 1987, entitled Swing Check Valve, now U.S. Pat. No. 4,809,738; and U.S. Ser. No. 060,249, filed June 9, 1987, entitled Swing Check Valve Disc, now U.S. Pat. No. 4,781,214.

BRIEF SUMMARY OF THE INVENTION

1. Field of the Invention.

This invention relates to improvements in valves generally known as swing check valves.

2. Background of the Invention.

Swing check valves utilize what is commonly known as a disc or clapper having a hinge pin, where the opposite end portions of the hinge pin are journalled in a stationary portion of the valve, such that the disc can swing about the axis of the hinge pin between its open and closed positions. It has been known to mount the end portions of the hinge pin in recesses formed in an annular wall in the valve, such that the valve can float at least a limited distance to and from the valve seat by movement of the hinge pin in the hinge pin recesses. Heretofore, however, no technique has been developed for retaining or trapping the end portions of the hinge pin in the hinge pin recesses which will be longlasting, yet allow the disc to swing freely to a fully open position, such as at about 90° from the plane of the valve seat.

BRIEF DESCRIPTION OF THE DRAWINGS

FIG. 1 is a cross sectional view through a wafer-type swing check valve constructed pursuant to this invention.

FIG. 2 is an elevational view of the combination seat and cage of the valve shown in FIG. 1 illustrating the location of the hinge pin recesses.

FIG. 3 is an elevational view of the body of the valve of FIG. 1 looking at the left end of the body as illustrated in FIG. 1.

FIG. 12 is a partial elevational view of the fitting of the valve of FIG. 10, with portions of the structure shown in phantom.

FIG. 13 is an end view looking at the left hand end of the fitting shown in FIG. 12.

FIG. 14 is a cross-sectional view through another form of swing check valve constructed pursuant to this invention.

FIG. 15 is a partial end view of the fitting of the valve of FIG. 14 showing the location of the hinge pin recesses.

FIG. 16 is a partial end view of the body of the valve shown in FIG. 14 looking at the left hand end of the body.

FIG. 17 is a partial end view similar to FIG. 16 of a modified valve body for the valve of FIG. 14.

FIG. 18 is a schematic elevational view utilizing the modified body structure shown in FIG. 17, illustrating the opposite end portions of hinge pin and hinge pin recesses in phantom.

FIG. 19 is a partial cross sectional view of a modification of the valve of FIG. 14.

FIG. 20 is another partial cross sectional view of a modification of the valve of FIG. 14.

FIG. 21 is a cross sectional view through another form of swing check valve constructed pursuant to this invention.

FIG. 22 is an elevational view of a snap ring which is employed in the valve structure of FIG. 21.

FIG. 23 is an elevational view of a retaining ring of the valve of FIG. 21 which is used for trapping the opposite ends of the hinge pin in the hinge pin recesses.

FIG. 24 is an end view of the cage of the valve of FIG. 21 showing the location of the hinge pin recesses.

FIG. 25 is a partial cross sectional view of a modification of the valve shown in FIG. 21.

FIG. 26 is a cross sectional view through another form of wafer-type check valve constructed pursuant to this invention.

FIG. 27 is a side elevational view of the combination cage and seat of the valve of FIG. 26.

FIG. 28 is an end view of the combination cage and seat of FIG. 27.

FIG. 29 is an end view of the retaining ring of the valve of FIG. 26.

FIG. 30 is a cross sectional view through still another wafer-type check valve constructed pursuant to this invention.

DETAILED DESCRIPTION OF THE DRAWINGS

Figures 4, 5:
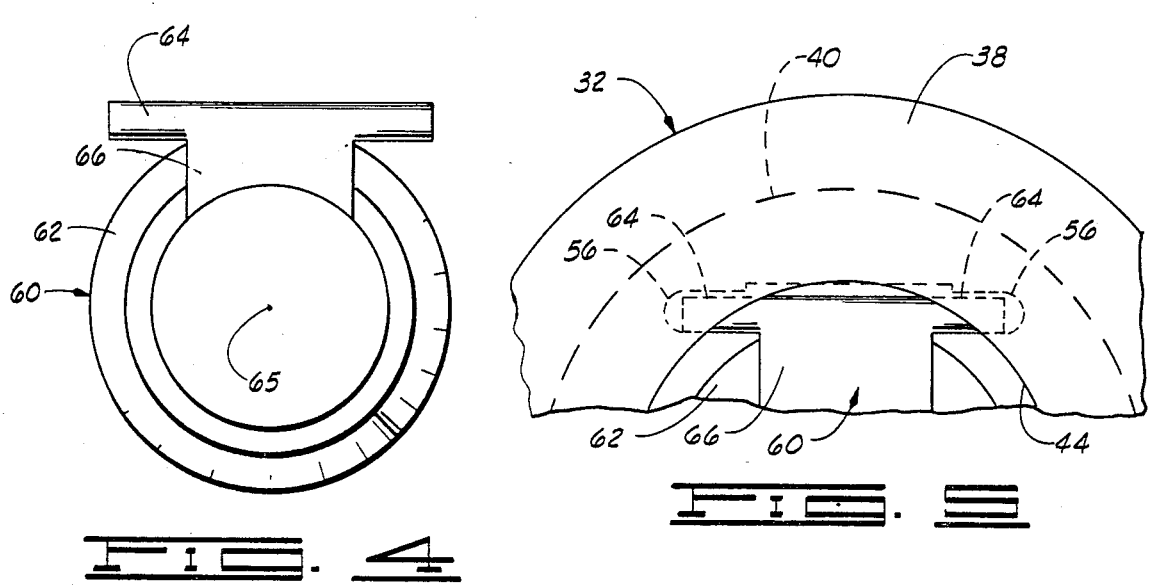
FIG. 4 is an elevational view of the disc of the valve shown in FIG. 1.
FIG. 5 is a partial elevational view looking at the right hand side of the valve as shown in FIG. 1, with portions of the hinge pin and the hinge pin recesses being shown in phantom.

Referring to the drawings in detail, and particularly FIGS. 1 through 6, reference character 32 generally designates a wafer-type check valve. The body 34 of the valve 32 has planar ends 36 and 38. A counterbore 40 is formed through the end 36 of the body 34 and provides an annular wall 42 having a circular opening 44 therethrough.

A combination valve seat and cage member 46 fits in the counterbore 40 against the annular wall 42 and is sized such that the outer face 48 thereof is coterminous with the end face 36 of the body 34. The member 46 has an opening 50 through the central portion thereof for the flow of fluid and an annular valve seat 52 surrounding the opening 50. The end face 54 of the member 46, as shown in FIG. 2, is provided with a counterbore 55 forming the valve seat 52, and a pair of hinge pin recesses 56 spaced radially outwardly from the opening 50. A more or less rectangular recess 58 is formed between the hinge pin recesses 56 for purposes to be described. The bottom of the recess 58 is coterminous with the plane of the valve seat 52.

A disc 60 is pivotally secured in the valve 32 to swing between open and closed positions away from and toward the seat 52. The disc 60 comprises a substantially flat, round main body portion 62 (FIGS. 1 and 4) and a hinge pin 64 formed integrally therewith. At least a portion of the hinge pin 64 protrudes radially from the outer periphery of the main body portion 62 and the hinge pin 64 extends in a plane at right angles to the longitudinal centerline 65 of the main body portion 62. A generally rectangular transition 66 extends between the hinge pin 64 and the main body portion 62 to provide adequate strength in the connection of the hinge pin 64 to the main body portion 62. As shown in FIG. 4, the opposite ends of the hinge pin 64 protrude from the opposite sides of the transition 66.

When the disc 60 is assembled onto the member 46 with the opposite end portions of the hinge pin 64 in the hinge pin recesses 56 and the member 46 is installed in the valve body 34, the annular wall 42 will overlap the opposite end portions of the hinge pin 64 as illustrated in FIG. 5. As a result, the wall 42 traps the hinge pin in the hinge pin recesses. On the other hand, as observed in FIG. 5, the opening 44 in the wall 42 extends radially beyond the hinge pin 64 throughout the width of the transition 66. And, the opening 44, when projected into the plane of the disc 60 encircles the disc. As a result, when the disc 60 is moved into an open position, it can swing freely through the opening 44, without interference, into a position substantially 90° from the closed position illustrated in FIG. 1. It should also be observed that the depth of each recess 56 is larger than the diameter of the hinge pin 64, such that the disc 60 will "float" a limited distance to and from the valve seat 52.

Figures 6, 7:
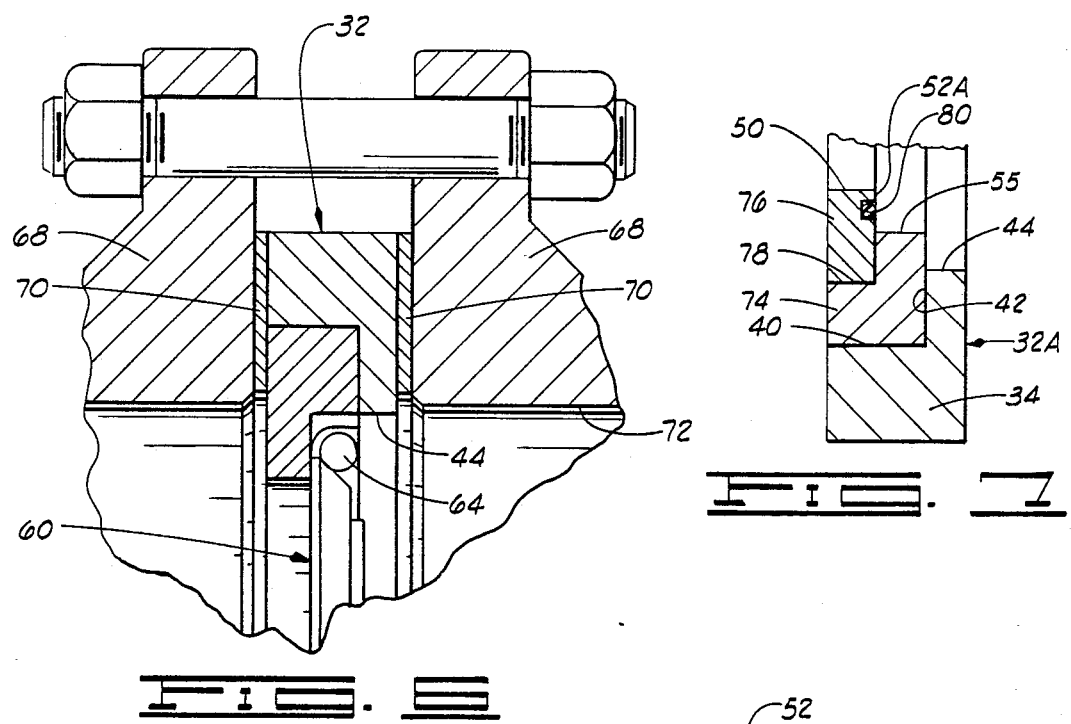
FIG. 6 is a partial cross sectional view of the upper portion of the valve of FIG. 1 as it would be installed between mating pipe flanges.
FIG. 7 is a partial cross sectional view of a modified valve body, cage and seat of a wafer-type valve.

The valve 32 is designed for being mounted between standard pipe flanges 68 as illustrated in FIG. 6. In a completed installation, gaskets 70 are provided between each end of the valve 32 and the adjacent pipe flange 60 to prevent leakage from around the valve. With this arrangement, it should be noted that neither one of the gaskets 70 is employed to trap the end portions of the disc hinge pin 64 in the hinge pin recesses. It will also be observed in FIG. 6 that with the bore 72 through the downstream pipe flange 68 being comparable in diameter to the diameter of the opening 44 of the valve, the disc 60 can swing into the downstream pipe flange into a position substantially 90° from its closed position.

The orientation of the disc 60 in the valve 32 may be assured by the use of a dowel pin 74 (FIG. 1) fitting in mating bores in the body 34 and the member 46.

A modified wafer-type check valve 32A is partially illustrated in FIG. 7. This embodiment utilizes the same configuration of valve body 34, but utilizes a separate cage 74 and separate valve seat 76. The cage 74 fits in the counterbore 40 of the valve body 34 against the wall 42 and is provided with an annular opening 55 therethrough corresponding to the counterbore 55 in the embodiment of FIGS. 1–6. The cage 74 will also, of course, be provided with hinge pin recesses and a transition opening corresponding to the hinge pin recesses 56 and opening 58 as shown in FIG. 2. The cage 74 also has a counterbore 78 therein facing in the same direction as the counterbore 40 in the valve body to receive the separate valve seat member 76. The valve seat 76 has the flow opening 50 therethrough, as in the previous embodiment, and is provided with a seal ring 80 in a corresponding annular groove in the seating face 52A for sealing engagement with the disc.

Figures 8, 9:
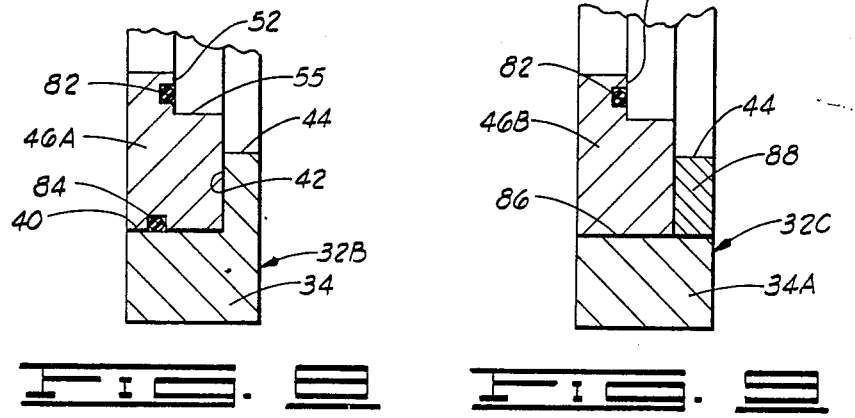
FIG. 8 is a view similar to FIG. 7, illustrating another embodiment.
FIG. 9 is another view similar to FIG. 7 illustrating still another embodiment of wafer-type valve.

Another modified wafer-type check valve is partially illustrated in FIG. 8 and is designated by reference character 32B. This valve utilizes the same valve body 34 and a modified combination valve seat and cage member 46A. In this embodiment, the seating face 52 of the member 46A is provided with a sealing member 82 mounted in a cooperating annular groove to provide sealing engagement with the valve disc. Also, an annular sealing ring 84 is provided in a mating annular groove in the outer periphery of the member 46A to sealingly engage the walls of the counterbore 40.

Still another wafer-type check valve is partially illustrated in FIG. 9 and is designated by the reference character 32C. In this embodiment, the modified valve body 34A is provided with a straight bore 86 therethrough to receive a modified valve cage and valve seat member 46B and separate retainer ring 88. The outer diameters of the members 46B and ring 88 substantially correspond to the diameter of the bore 86, and the thickness of the member 46B plus the thickness of the retainer ring 88 equals the length of the valve body 34A to provide a structure which will fit between mating pipe flanges in the same manner as the valve 32 previously described. In this structure, a sealing ring 82 is provided in the valve seat 52 to sealingly engage the disc, in the same manner as the embodiment illustrated in FIG. 8. The retaining ring 88 has an opening 44 therethrough corresponding with the bore 44 of the body 34 shown in the embodiment of FIGS. 1 through 6 of a size such that, when it is projected into the plane of the disc in a closed position, will encircle the disc. Also, the ring 88 is provided with hinge pin recesses and a transition opening (not shown) corresponding to the hinge pin recesses 56 and transition opening 58 as illustrated in FIG. 2.

Figure 10:
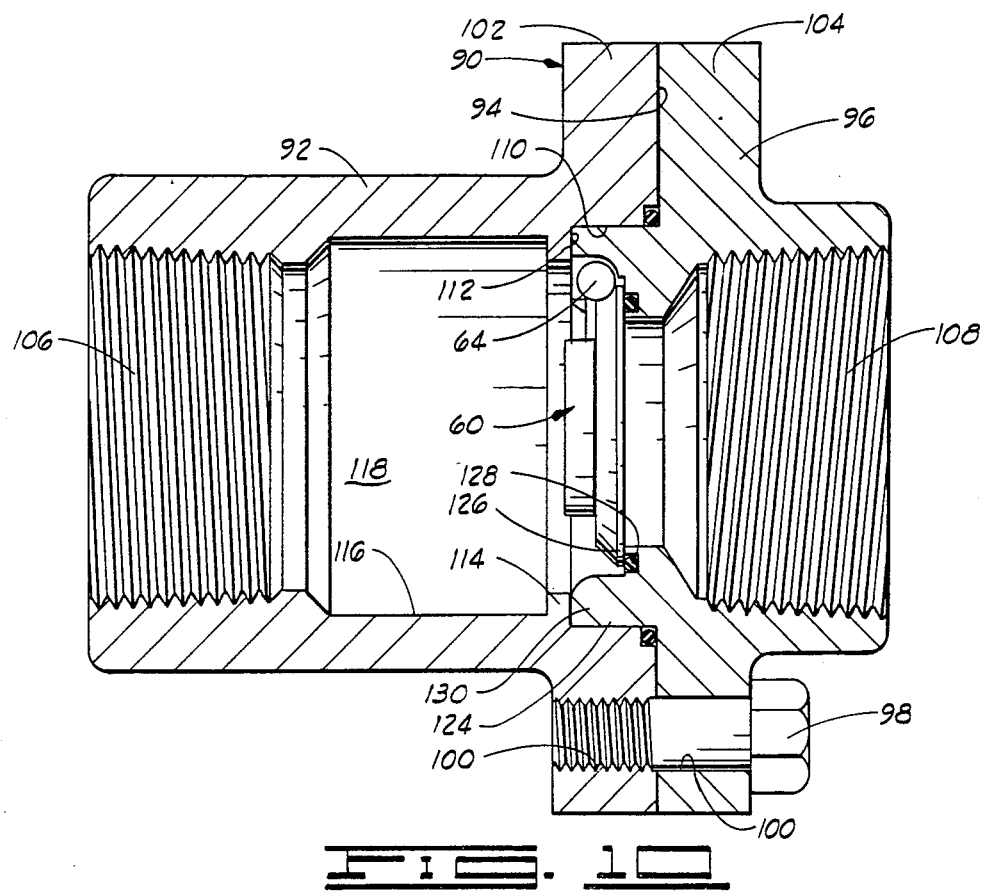
FIG. 10 is a cross-sectional view through another form of swing check valve constructed pursuant to this invention.

Another form of check valve pursuant to this invention is illustrated in FIG. 10 and is generally designated by the reference character 90. The valve 90 basically comprises a tubular valve body 92 having one planar end 94 to which is connected a tubular fitting 96 by threaded studs 98. The studs 98 extend through mating holes 100 in flanges 102 and 104 formed on the body 92 and fitting 96, respectively. The bores 100 in the body flange 102 are threaded to receive the threads of the studs 98 and hold the body 92 and fitting 96 in assembled relation. The outer, opposite ends of the body 92 and fitting 96 are internally threaded as indicated by reference characters 106 and 108 for the connection of the valve 90 in adjacent threaded pipe sections.

Figure 11:
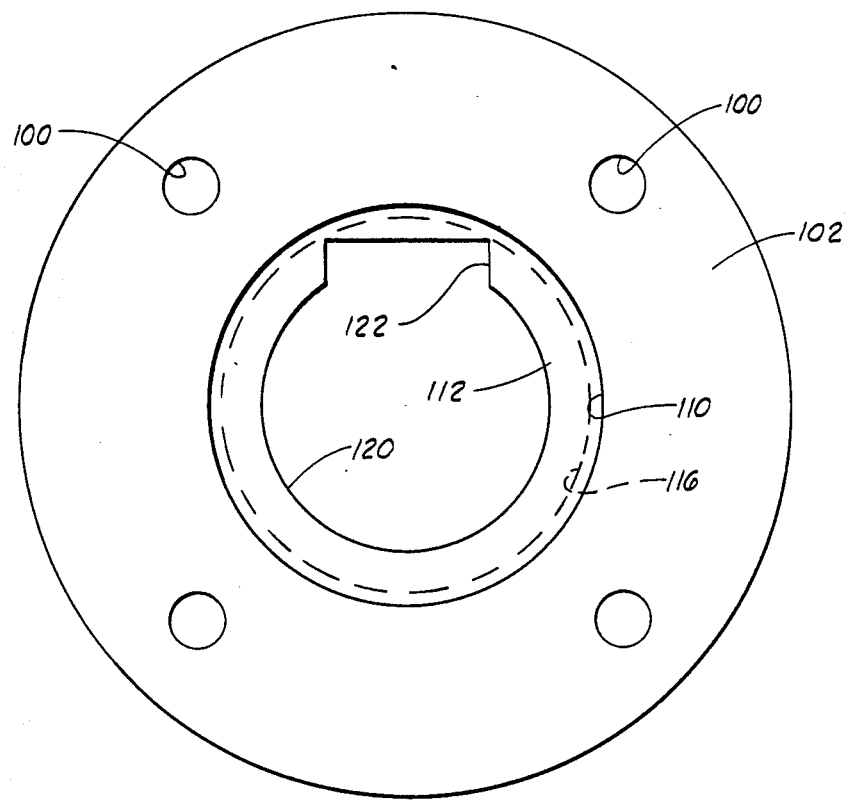
FIG. 11 is an end view of the valve body of the valve shown in FIG. 10 looking at the right hand end of the valve body, with the fitting removed.

The planar end 94 of the body 92 is provided with a counterbore 110 which forms an annular wall 112 in the body 92. The wall 112 is one face of a ring shaped structure 114 formed as a part of the valve body 92 to project inwardly from the wall 116 of the valve chamber 118. The wall 112, and hence the ring structure 114, has a generally circular opening 120 (FIG. 11) therethrough having a generally rectangular extension 122 at the upper side thereof to form a transition opening as will be described below.

FIGS. 12 and 13 illustrate the tubular fitting 96 in elevation. As shown, a circular extension 124 fits into the counterbore 110 of the valve body against the wall 112. The extension 124 provides an annular valve seat 126 to receive the main body portion of the valve disc 60 which will be constructed in the same manner as the valve disc 60 illustrated in FIGS. 1 and 4. A suitable sealing ring 128 is mounted in a mating groove in the valve seat 126 to sealingly engage the disc 60. The extension 124 also provides a cage 130 surrounding the disc 60 when the disc is in a closed position as shown in FIG. 10. The cage 130 has an opening 132 therethrough surrounding the major portion of the disc 60 and a hinge pin recess 134 communicating with the upper edge of the opening 132 and facing in the same direction as the valve seat 126. The hinge pin recess 134 extends from the outer end of the cage 130 to a position substantially coterminous with the valve seat 126 to receive the hinge pin 64 of the disc 60. The depth of the hinge pin recess 134 is greater than the diameter of the hinge pin 64, such that the valve disc 60 may "float" a limited distance to and from the seat 126.

With the valve 90 assembled as shown in FIG. 10, the wall 112, adjacent the outer edges of the transition opening 122, will overlap the end portions of the hinge pin 64 and hinge pin recess 134 to trap the hinge pin in the hinge pin recess and maintain the disc in assembled relation. On the other hand, the opening 120 and transition portion 122, when projected into the plane of the disc 60 in a closed position, encircles the disc 60, such that the disc 60 can swing in a clockwise direction from the position shown in FIG. 10 into a position substantially 90° from that shown in FIG. 10, with the disc oppositioned in the valve chamber 118, for a complete opening of the valve.

A check valve similar to the valve 90 is illustrated in FIG. 14 and generally designated by reference character 140. The valve 140 comprises a tubular valve body 142 having a planar end 144, and a tubular fitting 146 connected to such planar end 144. The body 142 and fitting 146 are provided with mating circumferential flanges 148 and 150, and the body and fitting are interconnected by screws or bolts 152 extending through mating apertures 154 in the flanges. The opposite, outer ends of the body 142 and fitting 146 are internally threaded, as indicated at 156 and 158 for the threaded connection of the valve 140 in adjacent pipe sections.

The planar end 144 of the body 142 has a counterbore 160 therein which receives a circular extension 162 on the fitting 146. A suitable sealing ring 163 is provided in a mating groove in the counterbore 160 sealingly engage the outer surface of the tubular extension 162. The end of the counterbore 160 provides an annular wall 164 in the body 142. The wall 164 is one end face of an annular ring shaped member 166 formed in the body 142 and is provided with an opening 168 therein. In the embodiment shown in FIGS. 14 and 16, the opening 168 is circular.

The extension 162 of the fitting 146 has a counterbore 170 therein which provides a valve seat 172 containing a sealing ring 174 mounted in a mating groove therein. The seat 172 is sized to receive the main body portion of a disc 60 constructed in the same manner as previously described. As shown most clearly in FIG. 15, the extension 162 is also provided with a transition recess 176 therein, along with a pair of hinge pin recesses 178 extending from opposite sides of the transition opening 176. The bottom of the transition opening 176 is coterminous with the sealing face 172. The hinge pin recesses 178 are sized to receive the opposite end portions of the hinge pin 64, whereby the disc 60 can "float" a limited distance to and from the valve seat 172.

The size of the opening 168 in the annular wall 164 is such that if projected into the plane of the disc 60, when the disc 60 is closed, will encircle the disc and extend radially beyond that portion of the hinge pin 64 aligned with the transition between the disc and the hinge pin. The size of the opening 168 is, however, sized such that the wall 164 will cover at least a portion of the hinge pin recesses 178, and thus hold the hinge pin 64 therein. Thus, the disc 60 can swing from the closed position as shown in full lines in FIG. 14 to the fully opened position shown in phantom in FIG. 14. That is, the disc 60 can swing freely through the annular wall 164 to a position substantially 90° from its closed position.

As shown in FIG. 17, the opening 168 in the wall 164 can be modified to provide a generally rectangular transition opening 180 in one side thereof. As indicated schematically in FIG. 18, the transition opening 180 extends radially beyond the transition 66 of the disc 60, while the adjacent portions of the wall 164 cover the hinge pin recesses 178 to trap the end portions of the hinge pin 64 therein.

As shown in FIG. 19, the valve 140 may be modified to provide a separate member 182 forming a valve seat 172A and cage 162A surrounding the major portion of the periphery of the disc 60. The combination seat and cage member 182 fits in a counterbore 184 formed in the end of the fitting 146 and is sealed therein by a suitable sealing ring 186. With this arrangement, the opening 168 in the wall 164 may take the shape of either that shown in FIG. 16 or FIG. 17. In either event, the disc 60 can swing through the opening 168 between its open and closed positions.

FIG. 20 illustrates another modification of the valve 140 wherein the wall 164 is formed by a separate retainer ring 188 fitted in the counterbore 160 of the valve body 142. The retainer 188 is held between the end of the extension 162 of the fitting 146 and the end 164A of the counterbore 160 when the valve is assembled. The retainer ring 188 has an opening 168 therein conforming to the configuration shown in either FIG. 16 or 17, such that the disc 60 can swing therethrough between its open and closed positions through an arc of substantially 90°.

Another form of check valve pursuant to this invention is illustrated in FIG. 21 and generally designated by reference character 190. In this form of valve, the valve body 192 has planar ends 194 for connection between standard pipe flanges. A counterbore 196 extends through the major portion of the length of the valve body 192 to provide an annular shoulder 198. The inner, radial portion of the shoulder 198 forms a valve seat for the disc 60 and has a suitable sealing ring 200 therein to sealingly engage the disc 60.

A valve cage 202 fits in the counterbore 196 against the shoulder 198 to surround and support the disc 60. As shown in FIG. 24, the cage 202 has a hinge pin recess 204 therein at one side of the opening 206 through the cage to receive the hinge pin 4. The hinge pin recess 204 faces in the same direction as the valve seat and is greater in depth than the diameter of the hinge pin 64, such that the disc 60 can "float" a limited distance to and from the valve seat.

The opposite end portions of the hinge pin 64 are held in the hinge pin recess 204 by a retainer ring 208 fitting in the counterbore 196 against the end of the cage 202. As shown in FIG. 23, the retainer ring 208 has an opening 210 therein which includes a rectangular extension 212 at one side thereof. The opening 210, when projected into the plane of the disc 60, with the disc in a closed position, encircles the disc and extends radially beyond that portion of the hinge pin 64 corresponding with the transition 66 of the disc, such that the disc 60 can swing freely through the opening 210 through an arc of substantially 90°.

The retainer ring 208 is held in operating position against the adjacent end of the cage 202 by a snap ring 214 shown in FIGS. 21 and 22. The snap ring 214 is a discontinuous ring and the free ends 216 thereof are preferably provided with openings 218 to facilitate the use of a tool in collapsing the ring 214 during installation in the valve body 192. The ring 214 fits in a mating annular groove 220 formed in the counterbore 196. During installation, the ring 214 is collapsed to a diameter less than the diameter of the counterbore 196, such that the ring 214 can be inserted into the left hand end of the body 192 as shown in FIG. 21 against the retainer ring 208 and then released. Whereupon, the snap ring 214 will expand into the cooperating groove 220 and hold the retainer ring 208 and cage 202 in the assembled position illustrated in FIG. 21. The opening 222 through the ring 214, when the ring 214 is expanded into the groove 220 is larger than the opening 210 through the retainer ring 208.

As shown in FIG. 25, the valve 190 may be modified to provide a separate seat member 224 instead of having the seat a part of the valve body. In this embodiment, the seating member 224 provides an annular valve seat 226 having a suitable sealing ring 228 therein sealingly engaging the disc 60. A radial flange extension 230 of the seat member 224 mates in a corresponding recess 232 in the valve body wall 198 and is held therein by the cage 202 when the valve is fully assembled. With this arrangement, the valve seat may be readily replaced in the event of wear.

Another form of wafer type check valve constructed pursuant to this invention is illustrated in FIG. 26 and designated by reference character 234. The body 235 of the valve 234 has planar ends 236 for mating with adjacent pipe flanges and has a counterbore 238 extending through the major portion of the length thereof to form an annular shoulder 240 in the valve body. A combination seat and cage member 242 fits in the counterbore 238 against the shoulder 240, and is provided with a tubular extension extending through the remainder of the bore 244 through the valve body, where the end of the member 242 adjacent the right hand side of the body as shown in FIG. 26 is coterminous with the right hand end of the valve body. The member 242 is preferably sealed in the valve body by a suitable sealing ring 246. The member 242 provides an annular valve seat 248 having a suitable sealing ring 250 therein mating with the disc 60 when the disc is in the closed position.

As shown in FIGS. 27 and 28, the member 242 has a cage portion 252, with a hinge pin recess 254 communicating with the opening 256 through the cage portion 252. The hinge pin recess 254 is sized to receive the hinge pin 64 of the disc 60, as well as a portion of the disc transition 66. The depth of the hinge pin recess 254 is greater than the diameter of the hinge pin 64, such that the disc 60 may "float" to and from the valve seat 248 for a limited distance.

As shown in FIGS. 26 and 29, the member 242 is held in operating position in the valve body 235 by means of a snap ring 258 fitting in an annular groove 260 formed in the counterbore 238. The snap ring 258 is a discontinuous ring with its free ends 262 normally separated as shown in FIG. 29, such that when the ring is partially collapsed and inserted into the valve body 235, the ring will spring outwardly to the larger diameter into the mating groove 260. When assembled in the valve 234, the ring 258 has an opening 264 therein which includes a rectangular extension 266 at one side of the opening. The opening 264, when projected into the plane of the disc 60, with the disc in a closed position, encircles the main body portion of the disc and extends radially outward of that portion of the hinge pin aligned with the transition. On the other hand, the ring 258 overlaps the opposite end portions of the hinge pin recess 254 to trap the opposite end portions of the hinge pin 64 in the hinge pin recess. Thus, the disc 60 may swing freely through the ring 258 through an arc of approximately 90° between its open and closed positions.

The valve 234 may be modified as illustrated in FIG. 30 and designated by reference character 234A. In this modification, the valve body 235A is modified to provide a cage portion 252A surrounding the disc 60 when the disc is in a closed position. The cage portion 252A is provided with a hinge pin recess 254A corresponding to the hinge pin recess 254 of the embodiment shown in FIGS. 26, 27 and 28. The modified valve body 235A is also shaped to provide an annular valve seat 248A and sealing ring 250 therein for mating with the disc 60 when the disc is closed. In this embodiment, the retainer ring 258 functions solely to trap the opposite end portions of the hinge pin 64 in the hinge pin recess 254A. As in the previous embodiment, the opening 264 through the ring 258, when projected into the plane of the disc 60, with the disc 60 closed, is sufficiently large to encircle the disc and the transition 66, such that the disc 60 can swing freely through the retainer ring 258 through an arc of substantially 90°.

Changes may be made in the combination and arrangement of parts or elements as heretofore set forth in the specification and shown in the drawings without departing from the spirit and scope of the invention as defined in the following claims.

What is claimed is:

1. A swing check valve, comprising:
  a body having a substantially planar, flanged end;
  a tubular fitting having a substantially planar, flanged end mating with said planar end of the body;
  a disc supported in the fitting for swinging movement into open and closed positions, the disc having a substantially flat, round main body portion and a hinge pin formed integrally therewith extending in a plane at a right angle to the longitudinal axis of the main body portion of the disc, the disc also having a transition between the main body portion of the disc and the central portion of the hinge pin, whereby the opposite end portions of the hinge pin project from the opposite sides of the transition;
  a valve seat in the fitting having an annular seating area sized to mate with the main body portion of the disc when the valve is closed;
  a cage in the fitting surrounding over one-half of the periphery of the disc when the disc is closed, having a pair of hinge pin recesses therein opening in the same direction that the seating area faces for journaling the end portions of the hinge pin therein, and having an opening therein sized to receive said transition; and an annular wall in the body abutting the cage on the side thereof opposite said seating area sized to trap the ends of the hinge pin in the hinge pin recesses and having an opening therethrough sized to receive the remainder of the disc when the disc is pivoted on the hinge pin.

2. A valve as defined in claim 1 wherein the valve seat and cage are formed as part of the fitting.

3. A valve as defined in claim 1 wherein the end of the fitting facing the body has a counterbore therein, and wherein the valve seat and cage are formed as a single member fitting in said counterbore.

4. A valve as defined in claim 1 wherein the wall is formed as a part of the valve body.

5. A valve as defined in claim 1 wherein the wall is formed by a separate ring in the body.

6. A valve as defined in claim 1 wherein the opposite ends of the body and tubular fitting are internally threaded.

7. A swing check valve, comprising:
- a body having one substantially planar, flanged end and one internally threaded end;
- a tubular fitting having one substantially planar, flanged end mating with the flanges end of the body and having an opposite, internally threaded end;
- a disc supported in the fitting for swinging movement between a closed position in the fitting and an open position in the body, the disc having a substantially flat, round main body portion and a hinge pin thereon extending in a plane at a right angle to the longitudinal axis of the main body portion of the disc;
- a valve seat in the fitting having an annular seating area sized to mate with the main body portion of the disc when the disc is closed;
- a cage in the fitting surrounding a portion of the periphery of the disc when the disc is closed, having a pair of hinge pin recesses therein opening in the same direction that the seating area faces for journalling the end portions of the hinge pin thereon; and
- an annular wall in the body abutting the cage on the side thereof opposite said seating area sized to trap the ends of the hinge pin in the hinge pin recesses and having an opening therethrough sized to receive the remainder of the disc when the disc is pivoted on the hinge pin.

8. A valve as defined in claim 7 wherein the valve seat and cage are formed as part of the fitting.

9. A valve as defined in claim 7 wherein the end of the fitting facing the body has a counterbore therein, and wherein the valve seat and cage are formed as a single member fitting in said counterbore.

10. A valve as defined in claim 7 wherein the wall is formed as part of the valve body.

11. A valve as defined in claim 7 wherein the wall is formed by a separate ring in the body.

* * * * *

UNITED STATES PATENT AND TRADEMARK OFFICE
CERTIFICATE OF CORRECTION

PATENT NO. : 4,905,728

DATED : March 6, 1990

INVENTOR(S) : John P. Scaramucci

It is certified that error appears in the above-identified patent and that said Letters Patent is hereby corrected as shown below:

Column 5, lines 31-32, "disoppositioned" should be --disc positioned--.

Column 9, line 24, change "flanges" to --flanged--

Signed and Sealed this

Sixteenth Day of July, 1991

Attest:

HARRY F. MANBECK, JR.

Attesting Officer

Commissioner of Patents and Trademarks